(12) United States Patent
Kim et al.

(10) Patent No.: US 10,237,491 B2
(45) Date of Patent: Mar. 19, 2019

(54) ELECTRONIC APPARATUS, METHOD OF CONTROLLING THE SAME, FOR CAPTURING, STORING, AND REPRODUCING MULTIFOCAL IMAGES

(71) Applicant: SAMSUNG ELECTRONICS CO., LTD., Suwon-si, Gyeonggi-do (KR)

(72) Inventors: Goun-young Kim, Seongnam-si (KR); Jeong-yong Park, Suwon-si (KR); Ha-joong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 14/248,549

(22) Filed: Apr. 9, 2014

(65) Prior Publication Data
US 2015/0035855 A1  Feb. 5, 2015

(30) Foreign Application Priority Data

Jul. 31, 2013 (KR) .................. 10-2013-0091167

(51) Int. Cl.
*G06T 5/00* (2006.01)
*H04N 5/235* (2006.01)
*H04N 5/232* (2006.01)

(52) U.S. Cl.
CPC .......... *H04N 5/2356* (2013.01); *G06T 5/007* (2013.01); *H04N 5/23212* (2013.01)

(58) Field of Classification Search
CPC ..... G06T 5/50; G06T 2200/21; G06T 7/0069; G06T 7/0097; G06T 2207/10016; G06T 2207/10144; G06T 2207/10148; G06T 2207/20221; G06T 5/007; H04N 5/2356; H04N 5/23212

See application file for complete search history.

(56) References Cited

U.S. PATENT DOCUMENTS

| 2008/0131019 | A1* | 6/2008 | Ng ......................... G06T 5/001 |
| | | | 382/255 |
| 2008/0231714 | A1* | 9/2008 | Estevez .............. H04N 5/23248 |
| | | | 348/208.16 |
| 2009/0059061 | A1 | 3/2009 | Yu et al. |

(Continued)

FOREIGN PATENT DOCUMENTS

| CN | 101853500 A | 10/2010 |
| CN | 102053339 A | 5/2011 |

(Continued)

OTHER PUBLICATIONS

PCT Search Report and Written Opinion issued for PCT/KR2014/007019 (dated Nov. 3, 2014).

(Continued)

*Primary Examiner* — Diane M Wills
(74) *Attorney, Agent, or Firm* — Jefferson IP Law, LLP

(57) ABSTRACT

Provided is a method of controlling an electronic apparatus. The method includes: generating a focus map that indicates focus values of a plurality of blocks defined by splitting a field; continuously capturing a plurality of images corresponding to the focus values in the focus map; and storing the plurality of images, focus value information of each of the plurality of images, and focus value information of the field.

13 Claims, 15 Drawing Sheets

(56) References Cited

U.S. PATENT DOCUMENTS

| | | | |
|---|---|---|---|
| 2009/0196522 A1* | 8/2009 | Hikida | G02B 7/365 |
| | | | 382/255 |
| 2009/0310885 A1* | 12/2009 | Tamaru | H04N 5/2356 |
| | | | 382/275 |
| 2011/0025830 A1 | 2/2011 | McNamer et al. | |
| 2012/0019703 A1 | 1/2012 | Thorn | |
| 2012/0019711 A1 | 1/2012 | Ng et al. | |
| 2012/0188394 A1* | 7/2012 | Park | H04N 5/23212 |
| | | | 348/222.1 |
| 2012/0281072 A1 | 11/2012 | Georgiev et al. | |
| 2013/0033626 A1 | 2/2013 | Ng et al. | |
| 2013/0044234 A1 | 2/2013 | Nagano et al. | |
| 2013/0044254 A1 | 2/2013 | Tzur | |
| 2013/0242086 A1* | 9/2013 | Brueckner | G06T 7/571 |
| | | | 348/135 |
| 2014/0002606 A1* | 1/2014 | Blayvas | G02B 27/0075 |
| | | | 348/46 |
| 2014/0016019 A1* | 1/2014 | Pitts | H04N 5/23212 |
| | | | 348/349 |

FOREIGN PATENT DOCUMENTS

| | | |
|---|---|---|
| CN | 102082864 A | 6/2011 |
| JP | 2013-088579 A | 5/2013 |
| KR | 10-2008-0090174 A | 10/2008 |
| KR | 10-2009-0022392 A | 3/2009 |
| KR | 10-2009-0032294 A | 4/2009 |
| KR | 10-2010-0100179 A | 9/2010 |
| KR | 10-2012-0039956 A | 4/2012 |

OTHER PUBLICATIONS

Extended European Search Report issued in related application EP 14831863.7, dated Feb. 2, 2017, 8 pages.

Office Action issued in related application CN 201480042939.2, dated May 4, 2018, with English language translation, 20 pages.

* cited by examiner

| 425 | 425 | 425 | 425 | 425 | 425 | 425 |
| --- | --- | --- | --- | --- | --- | --- |
| 425 | 425 | 425 | 425 | 425 | 500 | 500 |
| 425 | 425 | 425 | 425 | 569 | 519 | 543 |
| 482 | 482 | 482 | 482 | 519 | 519 | 543 |
| 581 | 581 | 581 | 581 | 581 | 581 | 566 |

ELECTRONIC APPARATUS, METHOD OF CONTROLLING THE SAME, FOR CAPTURING, STORING, AND REPRODUCING MULTIFOCAL IMAGES

RELATED APPLICATIONS

This application claims the priority benefit of Korean Patent Application No. 10-2013-0091167, filed on Jul. 31, 2013, in the Korean Intellectual Property Office, the disclosure of which is incorporated herein in its entirety by reference.

BACKGROUND

1. Field

One or more embodiments of the invention relate to an electronic apparatus, a method of controlling the same, and an image reproducing apparatus and method.

2. Description of the Related Art

When a subject is photographed using a photographing apparatus, a focal length is determined during the photographing process, and thus it is not possible to modify a focus of the photographed subject. Accordingly, when the subject is not in focus, a user is unable to obtain a focused image of the subject via post-correction. Also, when there are several subjects whose distances from the photographing apparatus are different in a field, it is difficult to obtain a focused image of all the subjects.

SUMMARY

One or more embodiments of the invention include an electronic apparatus, a method of controlling the same, and an image reproducing apparatus and method, wherein a user is able to focus an image to a predetermined location in a field even after photographing is performed.

Additional aspects will be set forth in part in the description which follows and, in part, will become apparent from the description, or may be learned by practice of the presented embodiments.

According to one or more embodiments, a method of controlling an electronic apparatus is provided. The method includes: generating a focus map indicating focus values of a plurality of blocks defined by splitting a field; continuously capturing a plurality of images corresponding to the focus values in the focus map; and storing the plurality of images, focus value information of each of the plurality of images, and focus value information of the field.

The method may further include generating a capturing sequence by aligning the focus values of the plurality of blocks in an order, wherein the continuously capturing may include continuously capturing the plurality of images according to the order of the focus values aligned in the capturing sequence.

The generating of the capturing sequence may include: when the number of focus values of the plurality of blocks is greater than a maximum number of capturing times, grouping the focus values and replacing the grouped focus values with a representative value; and when the number of focus values of the plurality of blocks is less than the maximum number of capturing times, adding a focus value between two adjacent focus values, where a difference between the two adjacent focus values is high.

The method may further include: determining a representative image of the plurality of images; and generating a depth map of the representative image using the plurality of images, wherein the focus value information of the field may be the depth map.

The method may further include: reproducing at least one image from among the plurality of images; determining one of the plurality of images, which has a focus value corresponding to a depth value at a point of the depth map, as a reproduction image, according to an input selection of the point while displaying the reproduced at least one image; and reproducing the reproduction image.

The method may further include: determining a representative image of the plurality of images; generating a depth map of the representative image using the plurality of images; matching each pixel of the representative image to one of the plurality of images by matching a depth value of the each pixel of the representative image to a focus value of the plurality of images using the depth map; and generating a file index map indicating a reproduction image matched to the each pixel of the representative image, wherein the focus value information of the field may be the file index map.

The method may further include: reproducing at least one image from among the plurality of images; while displaying the reproduced at least one image, determining one of the plurality of images matching a point selected according to an input selection, as the reproduction image, using the file index map; and reproducing the reproduction image.

The method may further include: while continuously capturing the plurality of images, stopping the continuous capturing of the plurality of images when a movement of the electronic apparatus is outside a global motion compensable range; and compensating a global motion of the plurality of images after the plurality of images are continuously captured.

According to one or more embodiments, an image reproducing method for reproducing an image file is provided, wherein the image file includes a plurality of images having different focus values, focus value information of each of the plurality of images, and focus value information of a field. The image reproducing method includes: reproducing at least one image from among the plurality of images; while displaying the reproduced at least one image, determining one of the plurality of images, which has a focus value corresponding to a focus value at a point selected according to an input selection, as a reproduction image, using the focus value information of each of the plurality of images and the focus value information of the field; and reproducing the reproduction image.

The focus value information of the field may be a depth map indicating a depth value of each pixel of a representative image.

The image reproducing method may further include: generating a depth map of a representative image using the plurality of images; and storing the depth map as the focus value information of the field.

The focus value information of the field may be a file index map indicating a reproduction image match to each pixel of a representative image.

The image reproducing method may further include: generating a depth map of a representative image using the plurality of images; matching each pixel of the representative image to one of the plurality of images by matching a depth value of the each pixel of the representative image to a focus value of the plurality of images using the depth map; generating a file index map indicating a reproduction image matched to the each pixel of the representative image; and storing the file index map as the focus value information of the field if view.

According to one or more embodiments, an electronic apparatus includes: a photographing unit that photographs an image by photoelectrically converting incident light; a focus map generating unit that generates a focus map indicating focus values of a plurality of blocks defined by splitting a field; a photographing control unit that controls the photographing unit to continuously capture a plurality of images corresponding to the focus values of the focus map; and a file generating unit that stores the plurality of images, focus value information of each of the plurality of images, and focus value information of the field.

The electronic apparatus may further include a capturing sequence generating unit that generates a capturing sequence by aligning the focus values of the plurality of blocks in an order, wherein the photographing control unit may control the photographing unit to continuously capture the plurality of images according to the order of the focus values in the capturing sequence.

When the number of focus values of the plurality of blocks is greater than a maximum number of capturing times, the capturing sequence generating unit may group the focus values and replace the grouped focus values with a representative value by grouping the focus values. When the number of focus values of the plurality of blocks is lower than the maximum number of capturing times, the capturing sequence generating unit may add a focus value between two adjacent focus values, where a difference between the two adjacent focus values is high.

The electronic apparatus may further include a depth map generating unit that determines a representative image of the plurality of images and generates a depth map of the representative image using the plurality of images, wherein the focus value information of the field may be the depth map.

The electronic apparatus may further include: a reproduction image determining unit that determines one of the plurality of images, which has a focus value corresponding to a depth value at one point of the depth map, as a reproduction image, according to an input selection of the point while displaying at least one image from among the plurality of images; and a reproducing unit that reproduces the reproduction image.

The electronic apparatus may further include: a depth map generating unit that determines a representative image of the plurality of images and generates a depth map of the representative image using the plurality of images; and a file index map generating unit that matches each pixel of the representative image to one of the plurality of images by matching a depth value of each pixel of the representative image to a focus value of the plurality of images using the depth map, and generates a file index map indicating a reproduction image matched to each pixel of the representative image, wherein the focus value information of the field may be the file index map.

The electronic apparatus may further include: a reproduction image determining unit that determines one of the plurality of images, which matches one point selected according to an input selection while at least one image from among the plurality of images is displayed, as the reproduction image, using the file index map; and a reproducing unit that reproduces the reproduction image.

The electronic apparatus may further include: a global motion detecting unit that stops the photographing unit from capturing of the plurality of images when a movement of the electronic apparatus is outside a global motion compensable range while the photographing unit is capturing the plurality of images; and a global motion compensating unit that compensates for a global motion of the plurality of images after the plurality of images are captured.

According to one or more embodiments, an image reproducing apparatus for reproducing an image file is provided, wherein the image file includes a plurality of images having different focus values, focus value information of each of the plurality of images, and focus value information of a field. The image reproducing apparatus includes: a reproduction image determining unit that determines one of the plurality of images, which has a focus value corresponding to a focus value at a point selected according to an input selection while at least one image from among the plurality of images is displayed, as a reproduction image, using the focus value information of each of the plurality of images and the focus value information of the field; and a reproducing unit that reproduces the reproduction image.

The focus value information of the field may be a depth map indicating a depth value of each pixel of a representative image.

The image reproducing apparatus may further include: a depth map generating unit that generates a depth map of a representative image using the plurality of images; and a file updating unit that stores the depth map as the focus value information of the field.

The focus value information of the field may be a file index map indicating a reproduction image matched to each pixel of a representative image.

The image reproducing apparatus may further include: a depth map generating unit that generates a depth map of a representative image using the plurality of images; a file index map generating unit that matches each pixel of the representative image to one of the plurality of images by matching a depth value of the each pixel of the representative image to a focus value of the plurality of images using the depth map, and generating a file index map indicating a reproduction image matched to the each pixel of the representative image; and a file updating unit that stores the file index map as the focus value information of the field.

According to one or more embodiments, a non-transitory computer-readable recording medium has recorded thereon computer program codes for executing a method of controlling an electronic apparatus when executed by a processor, the method includes: generating a focus map indicating focus values of a plurality of blocks defined by splitting a field; continuously capturing a plurality of images corresponding to the focus values in the focus map; and storing the plurality of images, focus value information of each of the plurality of images, and focus value information of the field.

According to one or more embodiments, a non-transitory computer-readable recording medium has recorded thereon computer program codes for executing an image reproducing method for reproducing an image file when executed by a processor, wherein the image file includes a plurality of images having different focus values, focus value information of each of the plurality of images, and focus value information of a field, the image reproducing method includes: reproducing at least one image from among the plurality of images; while displaying the reproduced at least one image; and reproducing the reproduction image, determining one of the plurality of images, which has a focus value corresponding to a focus value at a point selected according to an input selection, as a reproduction image, using the focus value information of each of the plurality of images and the focus value information of the field.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
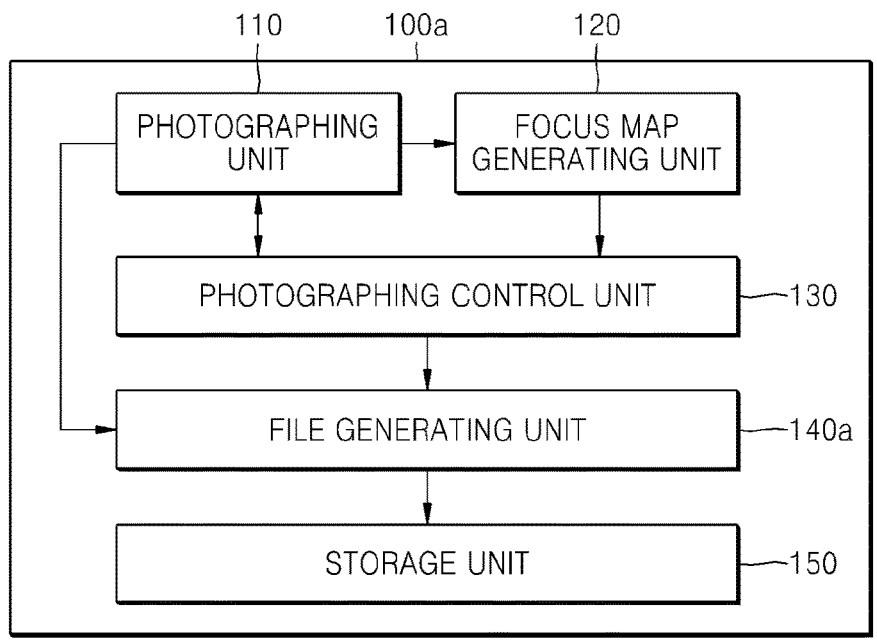
FIG. 1 is a block diagram of an electronic apparatus, according to an embodiment.

References will now be made in detail to the embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present disclosure.

The following description and accompanying drawings are provided for understanding various operations of the present embodiments, and details that may be easily realized by one of ordinary skill in the art may be omitted.

Also, the present disclosure and drawings are not provided to limit the embodiments of the invention, and scope of the embodiments shall be determined by the claims. Terms used herein shall be construed to have meanings and concepts suitable to the technical aspects that represent the embodiments the best.

Hereinafter, the embodiments will be described with reference to the accompanying drawings.

FIG. 1 is a block diagram of an electronic apparatus, (e.g., a digital photographing apparatus 100a), according to an embodiment. The electronic apparatus may include a digital camera, a camera module in a mobile phone or portable device, or any apparatus having image capturing capabilities. The digital photographing apparatus 100a includes a photographing unit 110, a focus map generating unit 120, a photographing control unit 130, a file generating unit 140a, and a storage unit 150.

The photographing unit 110 is a component for generating an image from an electric signal that has been converted from an optical signal. The photographing unit 110 includes a lens, an iris, and an image pickup device. The lens may include a plurality of lenses, such as a focus lens and a zoom lens. Also, the location of each lens may be adjusted by a step motor or the like, and thus a zoom magnification and focal length of each lens may be adjusted. An opening and closing degree of the iris is adjusted to adjust an amount of light incident on the image pickup device and to adjust a depth of a captured image.

An optical signal that penetrates through the lens and the iris forms an image of a subject on a light-receiving surface of the image pickup device. The image pickup device may be a charge coupled device (CCD) image sensor or a complementary metal oxide semiconductor image sensor (CIS), which converts an optical signal into an electric signal.

The focus map generating unit 120 generates a focus map indicating a focus value of each block of a plurality of blocks defined by splitting a field. Accordingly, before capturing an image, the focus map generating unit 120 moves the focus lens within a predetermined scan range to detect the focus value of each block of the plurality of blocks.

Figure 2:
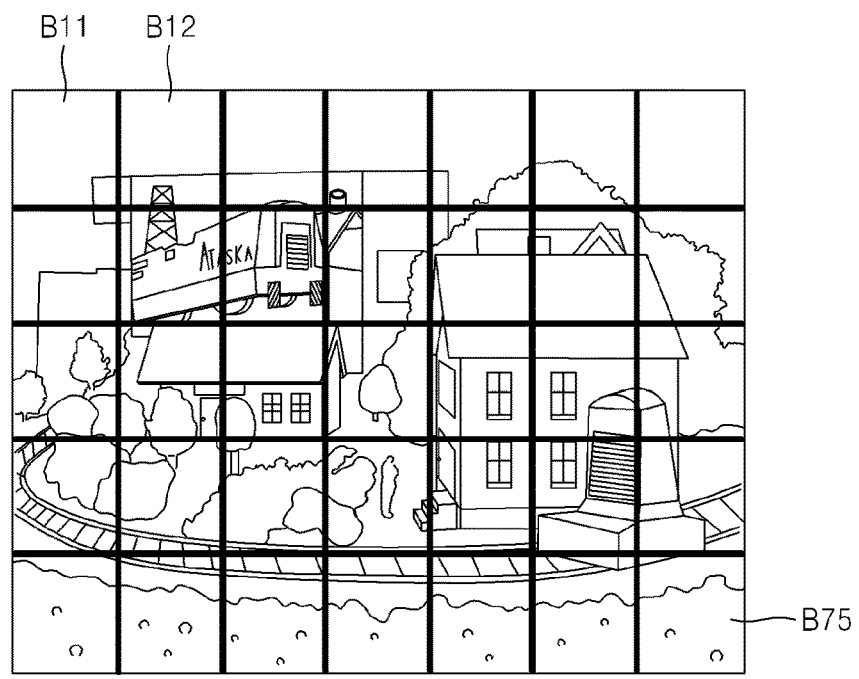
FIG. 2 is a diagram of a field split into a plurality of blocks, according to an embodiment.

FIG. 2 is a diagram of a field split into a plurality of blocks B11 through B75, according to an embodiment.

As shown in FIG. 2, the plurality of blocks B11 through B75 may be defined by splitting the field. The number of the blocks B11 through B75 may be variously set according to an embodiment. Also, as shown in FIG. 2, the blocks B11 through B75 may have the same size. Alternatively, the sizes of the blocks B11 through B75 may be different. For example, the sizes of the blocks B11 through B75 may decrease towards a center of the field and increase towards an edge of the field.

Figures 3, 4:
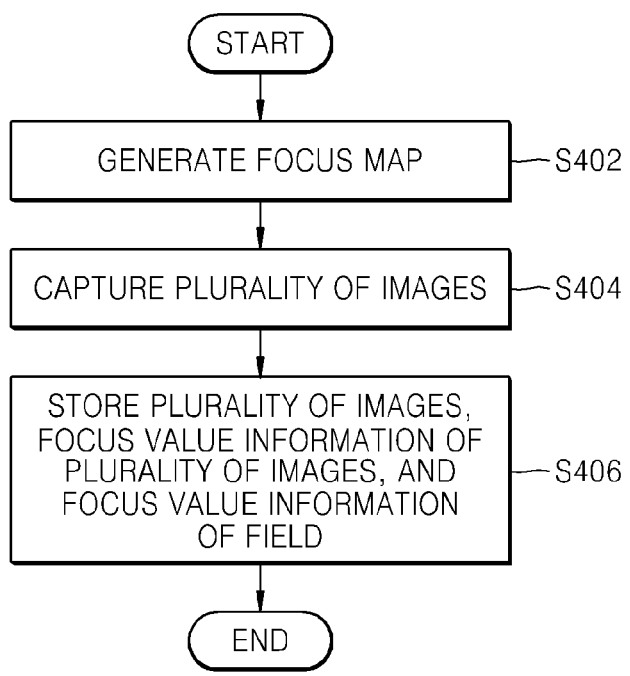
FIG. 3 is a diagram of a focus map, according to an embodiment.
FIG. 4 is a flowchart of a method of controlling an electronic apparatus, according to an embodiment.

FIG. 3 is a diagram of a focus map, according to an embodiment.

A focus map according to one or more embodiments indicates a focus value of each block of a plurality of blocks of a field. A focus value of each block represents a representative focus value of a corresponding block. Thus, even when a plurality of focus values exist in one block, the block may have one representative focus value. A representative focus value of each block may be defined as, for example, a peak focus value of the corresponding block.

A scan range of a focus lens may be an entire area that is covered by the focus lens when the focus lens is moved. An area that is covered by moving the focus lens may differ according to zoom positions. Accordingly, the scan range of the focus lens may be determined by referring to lens information and zoom position information.

The photographing control unit 130 controls the photographing unit 110 to continuously capture a plurality of images corresponding to the focus values of the focus map. Upon receiving the focus map from the focus map generating unit 120, the photographing control unit 130 extracts the focus values of the focus map. For example, when the focus map shown in FIG. 3 is generated, the focus values in the focus map are 425, 482, 500, 519, 543, 566, 569, and 581. The photographing control unit 130 controls the photographing unit 110 to perform the continuous image capturing operation by using the focus values extracted from the focus map. In other words, the plurality of images corresponding to the extracted focus values are continuously captured. According to one or more embodiments, by extracting the focus values to be continuously captured from the focus map, a plurality of focal lengths in the field may be covered overall even when the continuous image capturing operation is performed in a limited number of times.

When the continuous image capturing operation is performed with respect to the plurality of focal lengths, the plurality of images respectively corresponding to the focal lengths may be obtained. However, at this time, the number of continuous capturing times is increased, and thus a global motion may be generated between the plurality of images due to a movement of the digital photographing apparatus 100a during image capturing. Also, a large storage space may be required as the number of the plurality of images that are continuously captured increases. According to one or more embodiments, by extracting the focus values to be continuously captured from the focus map, the number of times for continuously capturing the images is not excessively increased, thereby decreasing a size or possibility of a global motion that may be generated during the capturing operation. Also, by performing the continuous image capturing operation after extracting a focal length in the field, the focal length may be further effectively extracted. Moreover, the number of plurality of images that are continuously captured may be decreased so that less storage space is used.

The file generating unit 140a stores the plurality of images that are continuously captured, focus value information of each of the plurality of images, and focus value information of the field. The plurality of images, the focus value information of each of the plurality of images, and the focus value information of the field may be stored in one file.

The focus value information of each image is information indicating which image corresponds to which focus value. For example, focus value information of a first image from among the plurality of images indicates that the first image corresponds to a focus value of 425.

The focus value information of the field is information indicating which region or pixel of the field corresponds to which focus value. Here, the focus value information of the field may denote a focus value itself or information related to the focus value. The information related to the focus value may be depth information of an image. The focus value information of the field may be defined in any manner, for example, defined with respect to blocks in the focus map, defined with respect to pixels, or defined with respect to blocks that are smaller than the blocks of the focus map. Alternatively, the focus value information of the field may be the focus map. Also, the focus value information of the field may be separately generated or differently generated from the focus map.

The storage unit 150 stores a file generated by the file generating unit 140a. The storage unit 150 is a non-volatile storage medium, for example, a hard disk drive, a flash memory, a solid state disk (SSD), or a magnetic recording medium.

FIG. 4 is a flowchart of a method of controlling an electronic apparatus, according to an embodiment.

First, a focus map is generated in operation S402 by moving a focus lens. The focus map may include focus value information of each of a plurality of blocks defined by splitting a field.

Then, a plurality of images corresponding to the focus values extracted from the focus map are continuously captured in operation S404.

Then, the plurality of images, focus value information of each of the plurality of images, and focus value information of the field are stored together in operation S406. The plurality of images, the focus value information of each of the plurality of images, and the focus value information of the field may be stored in one file.

Figure 5:
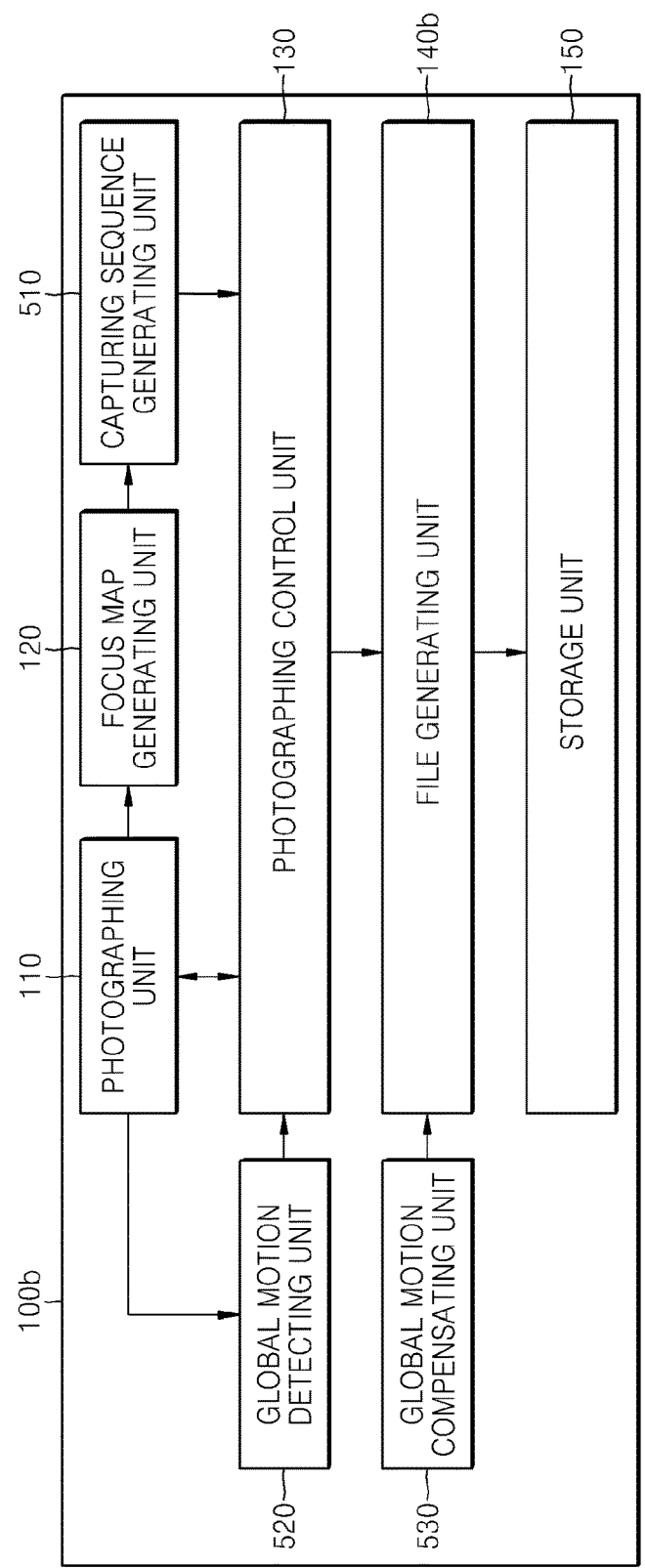
FIG. 5 is a block diagram of an electronic apparatus, according to another embodiment.

FIG. 5 is a block diagram of an electronic apparatus (e.g., a digital photographing apparatus 100b), according to another embodiment. The digital photographing apparatus 100b includes the photographing unit 110, the focus map generating unit 120, a capturing sequence generating unit 510, the photographing control unit 130, a file generating unit 140b, the storage unit 150, a global motion detecting unit 520, and a global motion compensating unit 530.

The photographing unit 110 is a component for generating an image from an electric signal that has been converted from an optical signal. The photographing unit 110 includes a lens, an iris, and an image pickup device.

The focus map generating unit 120 generates a focus map indicating a focus value of each block of a plurality of blocks defined by splitting a field. Accordingly, before image capturing, the focus map generating unit 120 moves a focus lens within a predetermined scan range to detect the focus values of the plurality of blocks.

The capturing sequence generating unit 510 extracts focus values to be continuously captured from the focus map, and generates a capturing sequence of the focus values to be continuously captured.

Figure 6:
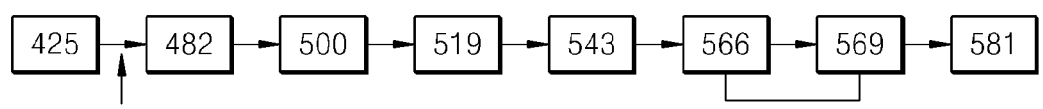
FIG. 6 is a diagram for describing a process of generating a capturing sequence, according to an embodiment.

FIG. 6 is a diagram for describing a process of generating a capturing sequence, according to an embodiment.

When the focus map shown in FIG. 3 is generated, the focus values of 425, 482, 500, 519, 543, 566, 569, and 581 may be extracted from the focus map. After extracting the focus values from the focus map, the capturing sequence generating unit 510 aligns the focus values in a descending order or ascending order. Whether to align the focus values in the descending order or ascending order is determined according to a moving direction of the focus lens during the continuous image capturing operation.

According to another embodiment, when the number of extracted focus values is higher than a maximum number of capturing times, the capturing sequence generating unit 510 may group some of the extracted focus values, replace the grouped focus values by a representative value, and adjust the number of focus values in the capturing sequence to the maximum number of capturing times. For example, when the maximum number of capturing times is seven, the capturing sequence generating unit 510 may group the focus values of 566 and 569, which are most adjacent to each other (or closest to each other in value) from among the extracted focus values, into one focus value. The grouped focus values of 566 and 569 may be replaced by a representative value by, for example, matching the two focus values to a focus value that is detected in more blocks, or matching the two focus values to an intermediate value between 566 and 569.

According to another embodiment, the capturing sequence generating unit 510 may add a focus value to the capturing sequence when the number of extracted focus values is lower than the maximum number of capturing times. For example, a focus value may be added to a range where a difference between focus values is high in the capturing sequence. For example, when the focus values are extracted from the focus map as shown in FIG. 6, a focus value may be added to a range where a difference between the focus values is highest, e.g., between focus values of 425 and 482. The added focus value may be an intermediate value between 425 and 482.

Here, the maximum number of capturing times may differ according to a type of the digital photographing apparatus 100*b*, or according to zoom positions. Alternatively, a user may set the maximum number of capturing times.

The photographing control unit 130 controls the photographing unit 110 to perform continuous image capturing operation by using the capturing sequence generated by the capturing sequence generating unit 510. In other words, the photographing control unit 130 may control the photographing unit 110 to perform the continuous image capturing operation by moving the focus lens according to the focus values in the capturing sequence.

Figure 7:
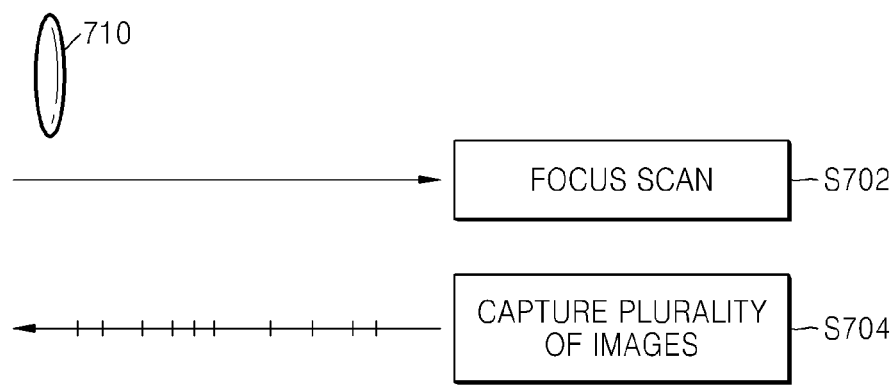
FIG. 7 is a diagram for describing a process of moving a focus lens, according to an embodiment.

FIG. 7 is a diagram for describing a process of moving of a focus lens 710.

According to the current embodiment, a capturing focus scan is performed in operation S702 as the focus lens 710 is moved in one direction according to a control of the focus map generating unit 120. Then, when the capturing sequence generating unit 510 generates the capturing sequence and the photographing control unit 130 controls the photographing unit 110 to perform the continuous image capturing operation, the focus lens 710 is moved in an order of the focus values in the capturing sequence to continuously capture a plurality of images in operation S704.

According to an embodiment, when operation S702 is performed in an ascending order of the focus values, the capturing sequence is determined by aligning the focus values in a descending order. On the other hand, when operation S702 is performed in a descending order of the focus values, the capturing sequence is determined by aligning the focus values in an ascending order.

According to another embodiment, when operation S702 is performed in an ascending order of the focus values, the capturing sequence may also be determined by aligning the focus values in the ascending order. When operation S702 is performed in a descending order of the focus values, the capturing sequence may also be determined by aligning the focus values in the descending order.

The global motion detecting unit 520 detects a global motion between the plurality of images captured by the photographing unit 110, and when the detected global motion is outside a global motion compensable range, stops the continuous image capturing operation. Global motion is a movement of the digital photographing apparatus 100*b* or a movement of the field, which may occur during image capturing. Since the plurality of images are obtained with respect to the same field in one or more embodiments, it is desirable that global motion is not generated while continuously capturing the plurality of images. However, when a size of the global motion is outside the global motion compensable range, the global motion detecting unit 520 may stop the continuous image capturing operation and induce or prompt a user to re-capture the images. Here, the global motion compensable range is a size of a global motion compensable by the global motion compensating unit 530. For example, the global motion detecting unit 520 may provide a message for inducing or prompting re-capturing of the image to the user. Alternatively, when the size of the global motion is outside the global motion compensable range, the global motion detecting unit 520 may control the photographing control unit 130 to automatically perform the continuous image capturing operation again.

In order to detect the global motion, the global motion detecting unit 520 may use, for example, a gyro sensor or an acceleration sensor included in the digital photographing apparatus 100*b*. Alternatively, the global motion detecting unit 520 may detect the global motion by detecting motion component information between the capturing of the plurality of images.

When the global motion between the plurality of images is within the global motion compensable range, the global motion compensating unit 530 compensates for the global motion between the plurality of images. For example, the global motion compensating unit 530 may process the plurality of images so that edges of the images are matched via up/down/left/right translation or rotation using a global motion alignment algorithm so that the global motion between the plurality of images is offset.

The file generating unit 140*b* stores the plurality of images that are continuously captured, focus value information of each of the plurality of images, and focus value information of the field together. According to the current embodiment, the plurality of images may be images whose global motion has been compensated. The plurality of images, the focus value information of each of the images, and the focus value information of the field may be stored in one file.

The storage unit 150 stores a file generated by the file generating unit 140*a*. The storage unit 150 is a non-volatile storage medium, for example, a hard disk drive, a flash memory, a SSD, or a magnetic recording medium.

Figure 8:
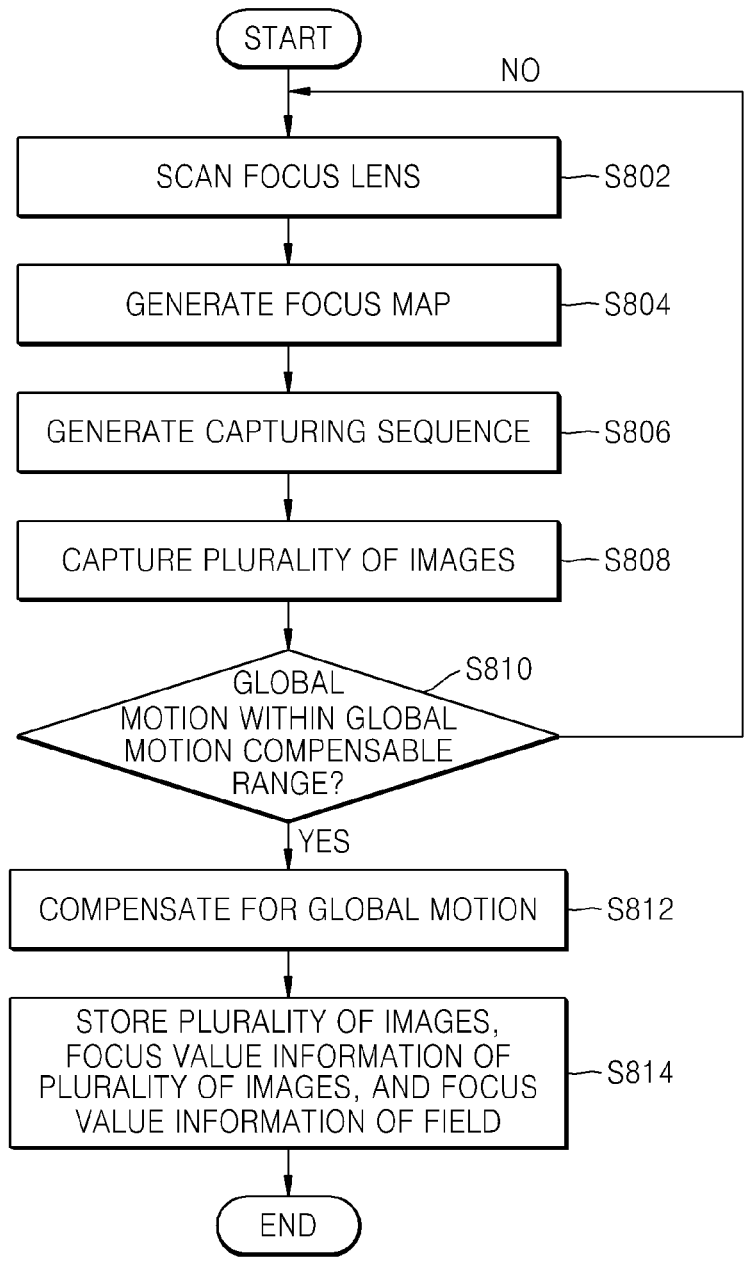
FIG. 8 is a flowchart of a method of controlling an electronic apparatus, according to another embodiment.

FIG. 8 is a flowchart of a method of controlling an electronic apparatus, according to another embodiment.

First, a focus lens is scanned within a focus lens movable range in operation S802 to generate a focus map in operation S804. The focus map may include a focus value of each block of a plurality of blocks defined by splitting a field. The focus lens movable range may be determined based on a type of the electronic apparatus (e.g., the digital photographing apparatus 100*b*) or a zoom position.

Then, the focus values extracted from the focus map are aligned to generate a capturing sequence in operation S806. As described above, whether to align the focus values in an ascending order or descending order is determined according to a scan direction of the focus lens while performing the continuous image capturing operation. In other words, the focus values may be aligned according to the scan direction to generate the capturing sequence, or according to a direction that is opposite to the scan direction to generate the capturing sequence.

According to another embodiment, when the number of focus values extracted from the focus map is higher than a maximum number of capturing times, some of the extracted focus values may be grouped together and the grouped focus values may be replaced by a representative value so as to adjust the number of focus values in the capturing sequence to be within the maximum number of capturing times.

According to another embodiment, when the number of focus values extracted from the focus map is lower than the maximum number of capturing times, a focus value may be added to the capturing sequence. Here, the focus value may be added to a range (e.g., between two focus values) where a difference between focus values is highest in the capturing sequence.

Then, a plurality of images are continuously captured according to the capturing sequence in operation S808.

In operation S810, when it is determined that a global motion between the plurality of images is outside a global motion compensable range while continuously capturing the plurality of images (NO of operation S810), the continuous image capturing operation is stopped. When the continuous image capturing operation is stopped, a message inducing or prompting re-capturing of the images is provided to a user, or re-capturing may be automatically performed. During the re-capturing, operation S802 may be performed or operation S808 may be performed.

When it is determined that the global motion between the plurality of images is within the global motion compensable range in operation S810 (YES of operation S810), the global motion is compensated for in operation S812.

Then, the plurality of images, focus value information of the plurality of images, focus value information of the field are stored in one file, in operation S814.

Figure 9:
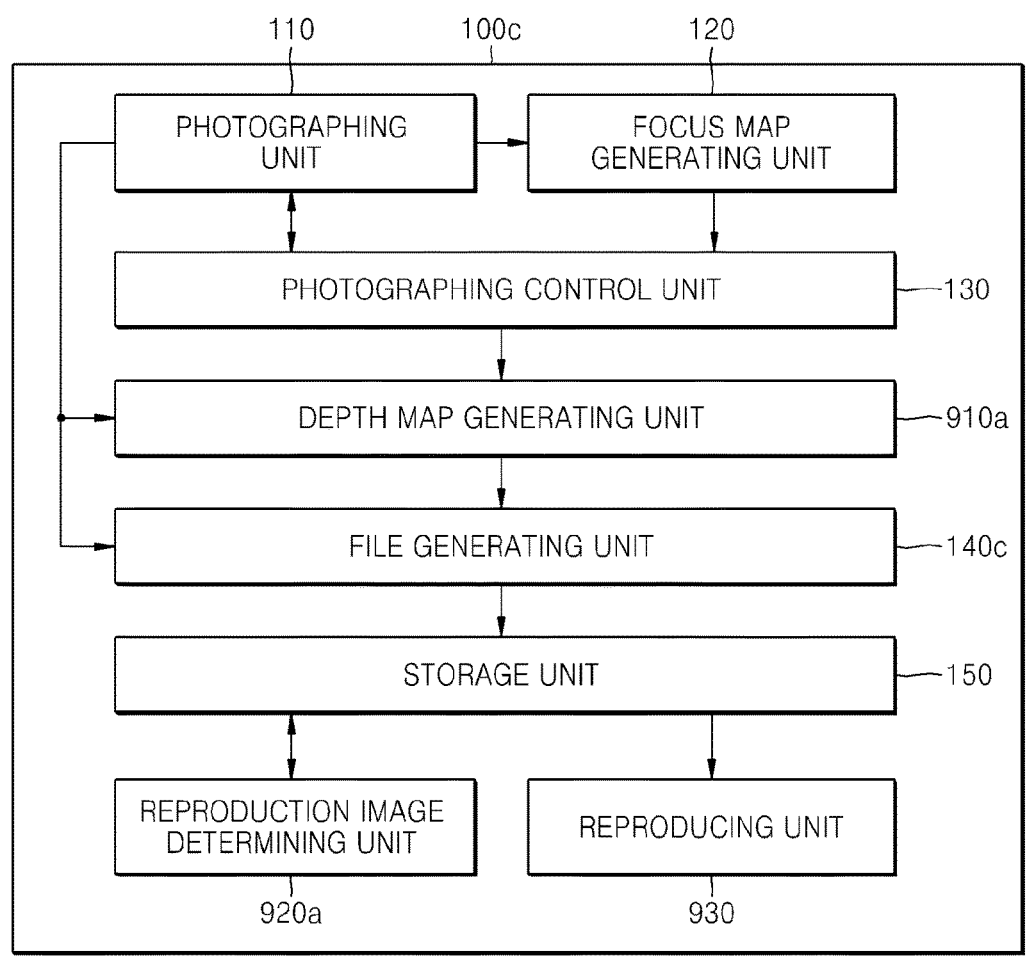
FIG. 9 is a block diagram of an electronic apparatus, according to another embodiment.

FIG. 9 is a block diagram of an electronic apparatus (e.g., a digital photographing apparatus 100c), according to another embodiment. The digital photographing apparatus 100c according to the current embodiment includes the photographing unit 110, the focus map generating unit 120, the photographing control unit 130, a depth map generating unit 910a, a file generating unit 140c, the storage unit 150, a reproduction image determining unit 920a, and a reproducing unit 930.

The photographing unit 110 is a component for generating an image from an electric signal that has been converted from an optical signal. The photographing unit 110 includes a lens, an iris, and an image pickup device.

The focus map generating unit 120 generates a focus map including a focus value of each block of a plurality of blocks defined by splitting a field. Accordingly, before performing image capturing, the focus map generating unit 120 detects the focus values of the plurality of blocks by moving a focus lens within a predetermined scan range.

The photographing control unit 130 controls the photographing unit 110 to continuously capture a plurality of images corresponding to the focus values in the focus map.

The depth map generating unit 910a determines a representative image of the plurality of images, and generates a depth map of the representative image. The depth map is generated so as to indicate focal length information of the field in more detail than the focus map. Accordingly, when the plurality of images are generated by using the depth map, a focused image of each point (e.g., each point selected by a user) may be provided to a user in a unit more detailed than a block unit of the focus map.

The representative image of the plurality of images may be determined in any manner, for example, may be the first image, an intermediate image, or the last image of the plurality of images.

The depth map may be generated via a predetermined depth map generating algorithm. According to the current embodiment, since the plurality of images are captured in a plurality of focal lengths, it is possible to generate the depth map by using the plurality of images. Also, it is possible to generate the depth map by using focus information obtained while scanning the focus lens to generate the focus map.

The file generating unit 140c stores the plurality of images that are continuously captured, focus value information of each of the plurality of images, and the depth map together.

The plurality of images, the focus value information of each of the plurality of images, and the depth map may be stored in one file.

The storage unit 150 stores a file generated by the file generating unit 140c.

The reproduction image determining unit 920a determines a reproduction image to be reproduced when an image file is captured and generated according to one or more embodiments.

Figure 10:
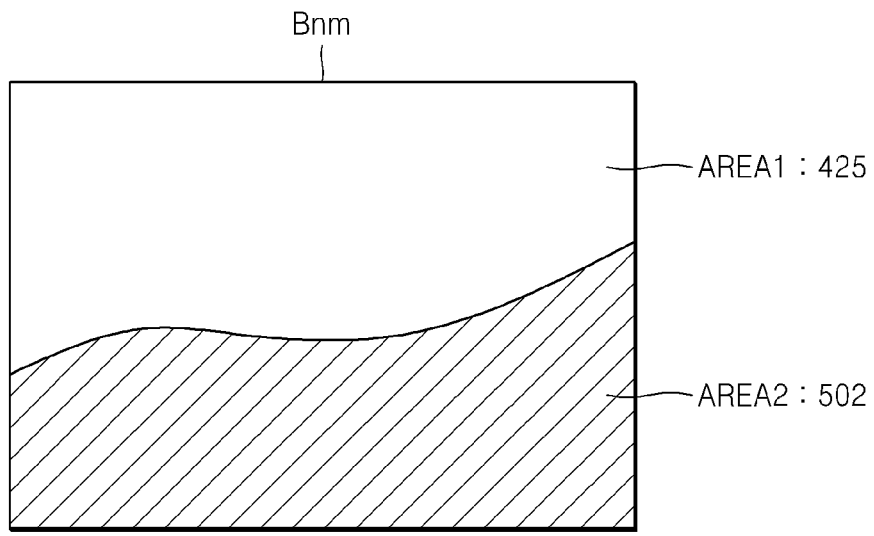
FIG. 10 is an image for describing a process of determining a reproduction image, according to an embodiment.

FIG. 10 is an image for describing a process of determining a reproduction image, according to an embodiment. The image shown in FIG. 10 corresponds to a block Bnm in an n-th row and m-th column of a focus map.

As shown in FIG. 10, at least one edge may exist in one block of the focus map, and also a plurality of focal lengths may exist. In the current embodiment, focal length information in more detail than the focus map is obtained by using a depth map, and while reproducing an image file, a user is able to reproduce an image further focused at a selected point. For example, as shown in FIG. 10, AREA1 has a focal length corresponding to a focus value of 425, and AREA2 has a focal length corresponding to a focus value of 502. When the user selects one point in AREA1, the electronic apparatus (e.g., the digital photographing apparatus 100c) reproduces an image corresponding to the focus value of 425, and when the user selects one point in AREA2, the digital photographing apparatus 100c reproduces an image corresponding to the focus value of 502. If a plurality of images are captured by using the focus map of FIG. 3, the image corresponding to the focus value of 502 does not exist, and thus an image having a focus value of 500 that is closest to the focus value of 502 may be determined and reproduced as a reproduction image.

When the image file is reproduced, a representative image may be reproduced at first. When the user selects one point in the representative image while the representative image is being reproduced, the reproduction image determining unit 920a obtains a depth value of the selected point by using the depth map, and determines an image having a focus value that is closest to a focus value corresponding to the depth value, as a reproduction image.

A user input for selecting a point may be received even while displaying the reproduction image determined from among the plurality of images. In this case, the reproduction image determining unit 920a obtains a depth value of the point by using the depth map, and determines an image having a focus value that is closest to a focus value corresponding to the depth value of the point, as a reproduction image. According to an embodiment, it is understood that the plurality of images have the same coordinate values, and thus the depth map may be matched to each of the plurality of images. According to another embodiment, matching information about how coordinate values of the plurality of images are matched to a coordinate value of the representative image may be stored with the image file, and each of the plurality of images may be matched to the depth map by using the matching information.

The reproducing unit 930 reproduces the reproduction image determined by the reproduction image determining unit 920a. For example, the reproducing unit 930 may reproduce the reproduction image on a display unit (not shown) included in the digital photographing apparatus 100c.

According to another embodiment, when the user inputs a control signal for storing one of the plurality of images as a separate file while reproducing the image file captured and stored according to one or more embodiments, the file generating unit 140c may generate the selected image as a separate image file and store the separate image file in the storage unit 150.

Figure 11:
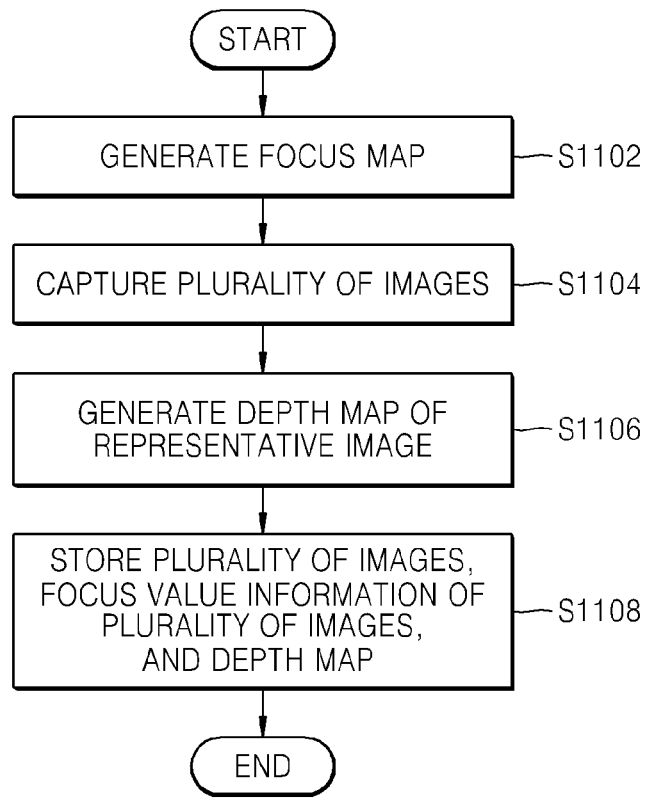
FIG. 11 is a flowchart of a method of controlling an electronic apparatus, according to another embodiment.

FIG. 11 is a flowchart of a method of controlling an electronic apparatus, according to another embodiment.

First, a focus map is generated in operation S1102 by moving a focus lens. The focus map may include focus value information of each block of a plurality of blocks defined by splitting a field.

Then, a plurality of images corresponding to focus values extracted from the focus map are continuously captured in operation S1104.

Then, a representative image is determined from the plurality of images, and a depth map of the representative image is generated in operation S1106. The representative image may be determined in any manner, for example, may be the first image, an intermediate image, or the last image of the plurality of images.

Then, the plurality of images, focus value information of each of the plurality of images, and the depth map are stored together in operation S1108. The plurality of images, the focus value information of each of the plurality of images, and the depth map may be stored in one file.

Figure 12:
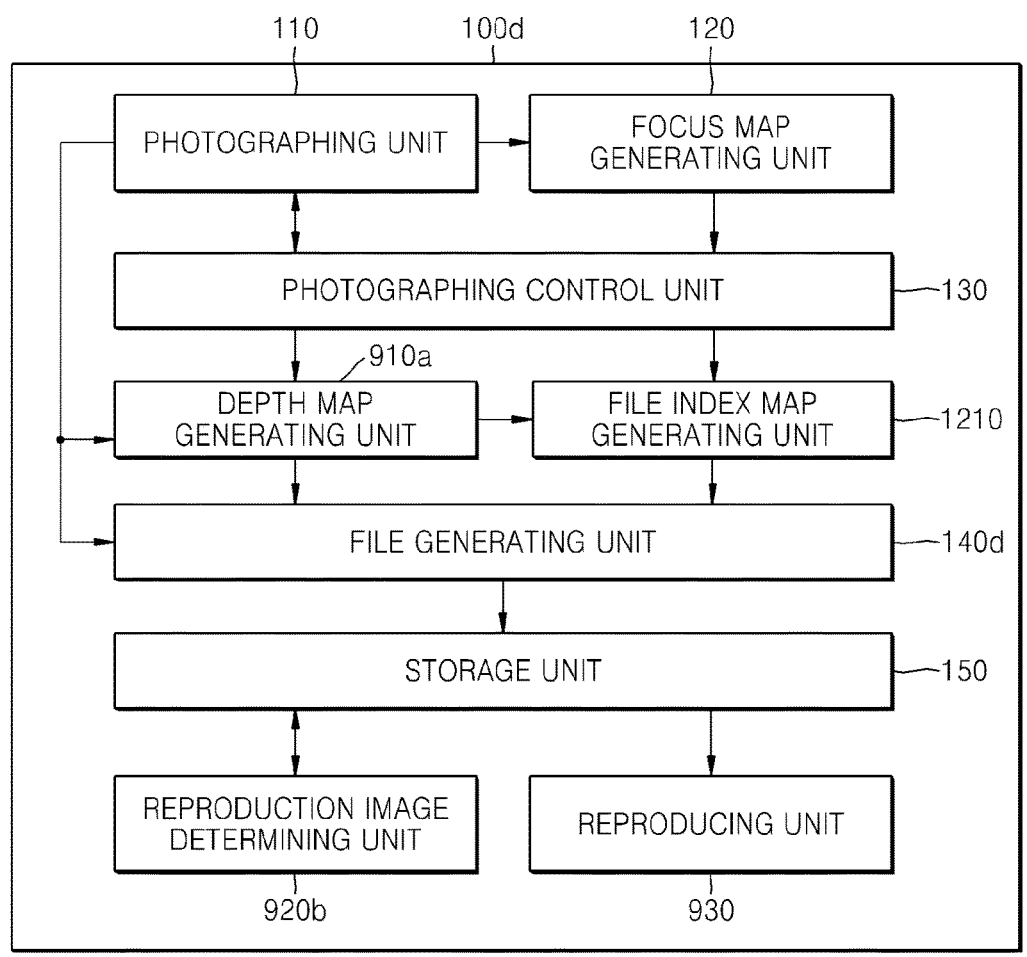
FIG. 12 is a block diagram of an electronic apparatus, according to another embodiment.

FIG. 12 is a block diagram of an electronic apparatus (e.g., a digital photographing apparatus 100d), according to another embodiment. The digital photographing apparatus 100d according to the current embodiment includes the photographing unit 110, the focus map generating unit 120, the photographing control unit 130, the depth map generating unit 910a, a file index map generating unit 1210, a file generating unit 140d, the storage unit 150, a reproduction image determining unit 920b, and the reproducing unit 930.

The photographing unit 110 is a component for generating an image from an electric signal converted from an optical signal. The photographing unit 110 includes a lens, an iris, and an image pickup device.

The focus map generating unit 120 generates a focus map indicating a focus value of each block of a plurality of blocks defined by splitting a field. Accordingly, before capturing, the focus map generating unit 120 detects the focus value of each block of the plurality of blocks by moving a focus lens within a predetermined scan range.

The photographing control unit 130 controls the photographing unit 110 to continuously capture a plurality of images corresponding to the focus values in the focus map.

The depth map generating unit 910a determines a representative image of the plurality of images, and generates a depth map of the representative image.

The file index map generating unit 1210 matches each pixel of the representative image to one image of the plurality of images by matching a depth value of each pixel of the representative image to a focus value of each of the plurality of images by using the depth map. The file index map generating unit 1210 then generates a file index map indicating image information matched to each pixel of the representative image. In other words, the file index map indicates which pixel of the representative image corresponds to which image of the plurality of images.

According to another embodiment, the file index map generating unit 1210 may generate the file index map from the focus map. In this case, the depth map generating unit 910a may be omitted.

Figure 13:
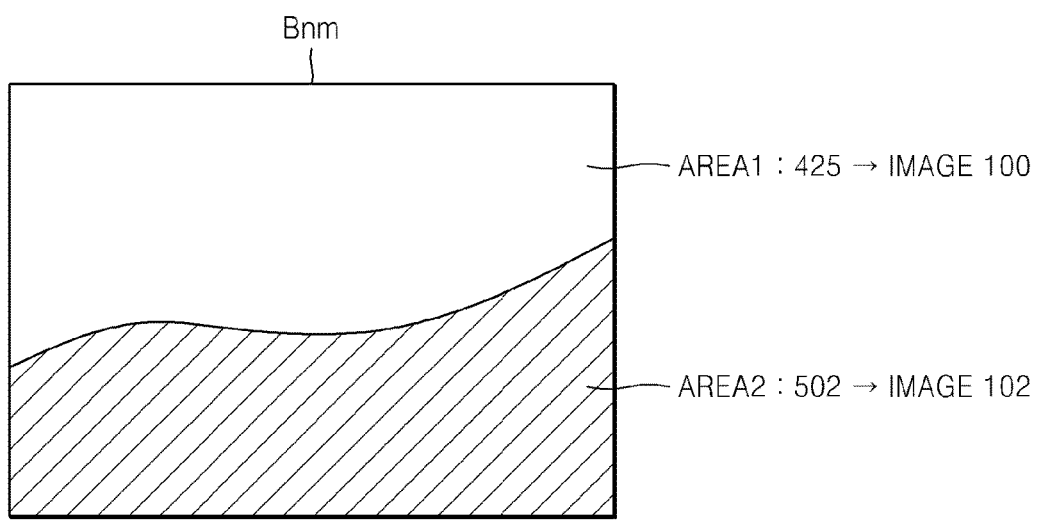
FIG. 13 is an image for describing a process of generating a file index map, according to an embodiment.

FIG. 13 is an image for describing a process of generating a file index map, according to an embodiment. The image shown in FIG. 13 corresponds to a block Bnm in an n-th row and m-th column of a focus map.

As shown in FIG. 13, an edge exists in one block of the focus map, and thus a plurality of focal lengths may exist. In the current embodiment, focal length information in more detail than the focus map is obtained by using a depth map, and information about an image corresponding to each pixel of a representative image is pre-stored by using the depth map. Accordingly, when an image file is reproduced, an image further focused to a point selected by a user may be reproduced, and a time taken to determine a reproduction image may be reduced. For example, as shown in FIG. 13, when AREA1 has a focal length corresponding to a focus value of 425 and AREA2 has a focal length corresponding to a focus value of 502, the electronic apparatus (e.g., the digital photographing apparatus 100d) according to the current embodiment stores IMAGE100 (which is an image corresponding to the focus value of 425 from among a plurality of images), as a reproduction image in a file index map. Also, the file index map generating unit 1210 stores an image corresponding to the focus value of 502 as a reproduction image in the file index map, with respect to AREA2. When the plurality of images are captured by using the focus map of FIG. 3, an image corresponding to the focus value of 500 does not exist, and thus the file index map generating unit 1210 stores IMAGE102 (which is an image having a focus value of 500 that is closest to the focus value of 502), as a reproduction image in the file index map.

The file generating unit 140d stores the plurality of images that are continuously captured, focus value information of each of the plurality of images, and the file index map together. The plurality of images, the focus value information of each of the plurality of images, and the file index map may be stored in one file.

The storage unit 150 stores a file generated by the file generating unit 140d.

When an image file captured and generated according to one or more embodiments is reproduced, the reproduction image determining unit 920b determines an image to be reproduced. While reproducing the image file, the representative image is reproduced first, and then the reproduction image may be determined by a user. When the user selects one point while reproducing one of the plurality of images, the reproduction image determining unit 920b according to the current embodiment searches for the reproduction image corresponding to a pixel at the selected point from the file index map, and determines the reproduction image.

The reproducing unit 930 reproduces the reproduction image determined by the reproduction image determining unit 920b.

Figure 14:
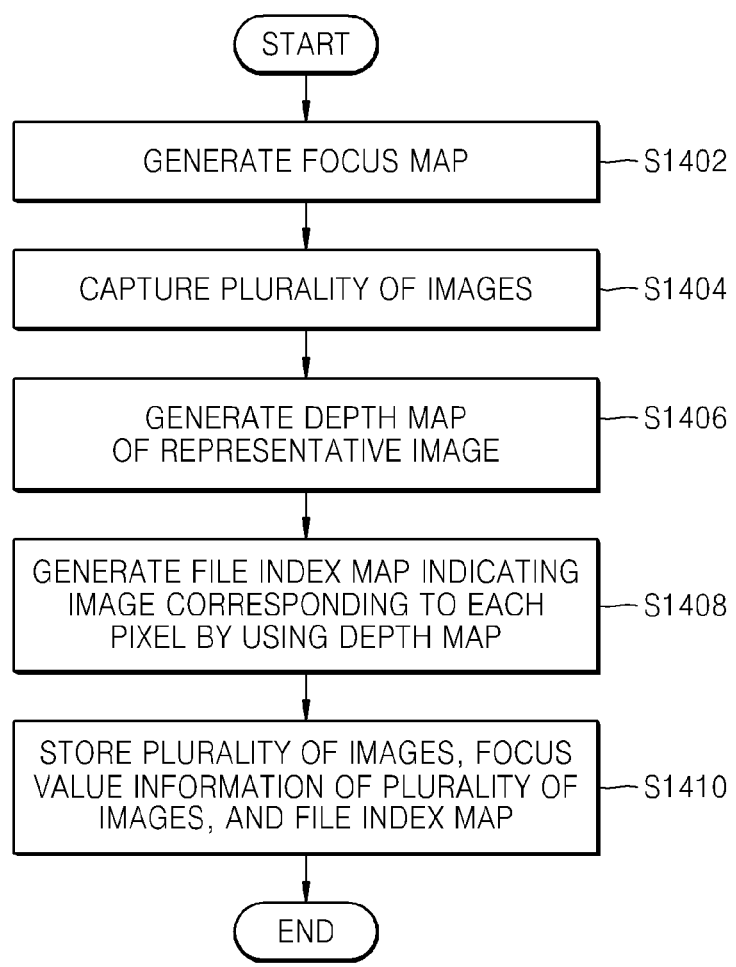
FIG. 14 is a flowchart of a method of controlling an electronic apparatus, according to another embodiment.

FIG. 14 is a flowchart of a method of controlling an electronic apparatus, according to another embodiment.

First, a focus map is generated in operation S1402 by moving a focus lens. The focus map may include focus value information of each block of a plurality of blocks defined by splitting a field.

Then, a plurality of images corresponding to focus values extracted from the focus map are continuously captured in operation S1404.

Then, a representative image is determined from the plurality of images, and a depth map of the representative image is generated in operation S1406. The representative image may be determined in any manner, for example, may be the first image, an intermediate image, or the last image of the plurality of images.

Then, each pixel of the representative image is matched to one of the plurality of images by matching a depth value of each pixel of the representative image to a focus value of each of the plurality of images by using the depth map, and a file index map indicating information about an image matched to each pixel of the representative image is generated in operation S1408.

Then, the plurality of images, focus value information of each of the plurality of images, and the file index map are stored together in operation S1410. The plurality of images, the focus value information of each of the plurality of images, and the file index map may be stored in one file.

Figure 15:
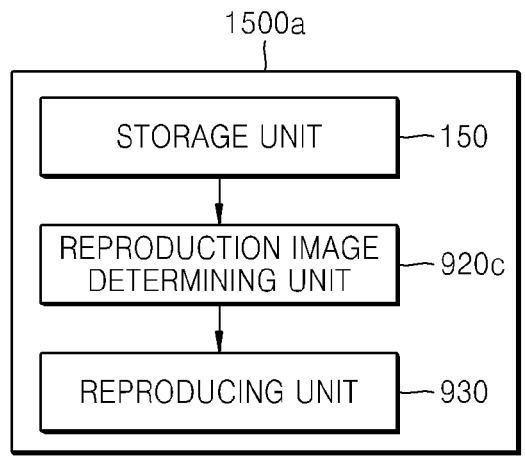
FIG. 15 is a block diagram of an image reproducing apparatus, according to an embodiment.

FIG. 15 is a block diagram of an image reproducing apparatus 1500a, according to an embodiment. The image reproducing apparatus 1500a according to the current embodiment includes the storage unit 150, a reproduction image determining unit 920c, and the reproducing unit 930.

The storage unit 150 stores at least one image file generated according to one or more embodiments. As described above, the image file may include a plurality of images, focus value information of the plurality of images, and focus value information of a field. The focus value information of the field may be one of a focus map, a depth map, and a file index map. The storage unit 150 is a non-volatile storage medium, such as a hard disk drive, a flash memory, an SSD, or a magnetic recording medium.

The reproduction image determining unit 920c determines a reproduction image to be reproduced when the image file is captured and generated according to one or more embodiments. When the image file is reproduced, a representative image is first reproduced, and then the reproduction image may be determined by a user. When the user selects one point while reproducing one of the plurality of images, the reproduction image determining unit 920c according to the current embodiment determines the reproduction image by using the focus value information of the field at the corresponding point. The focus value information of the field may be one of the focus map, the depth map, and the file index map according to an embodiment.

Figure 16:
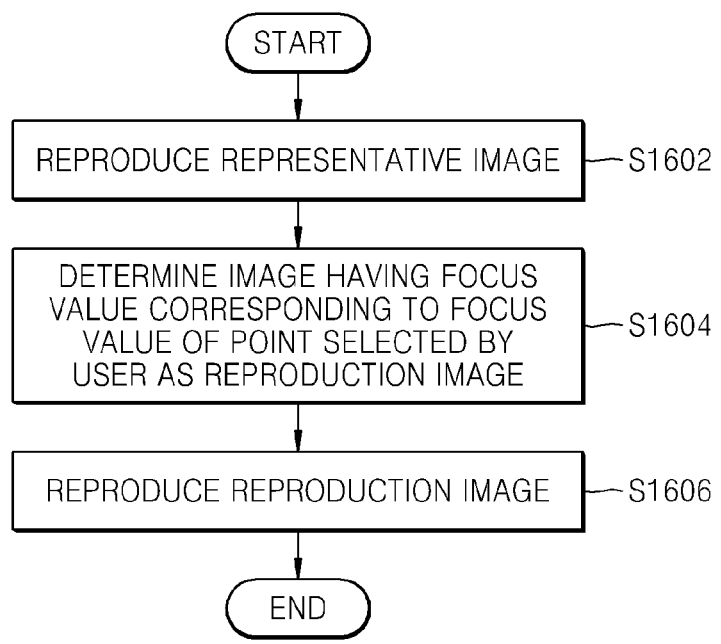
FIG. 16 is a flowchart of an image reproducing method, according to an embodiment.

FIG. 16 is a flowchart of an image reproducing method, according to an embodiment.

When a user requests to reproduce an image file generated according to one or more embodiments, a representative image of the image file is reproduced in operation S1602. As described above, the image file may include a plurality of images, focus value information of each of the plurality of images, and focus value information of a field. The focus value information of the field may be one of a focus map, a depth map, and a file index map.

Then, when the user selects one point in the representative image, an image having a focus value corresponding to a focus value of the point selected by the user is determined as a reproduction image in operation S1604. Here, in order to determine the reproduction image, the focus value information of the field may be used. The reproduction image may be determined as described above with respect to the digital photographing apparatus 100c or 100d. Also, when the user selects one point in the reproduction image while one of a plurality of images determined as the reproduction image is being reproduced, the reproduction image is determined again by using the focus value information of the field.

When the reproduction image is determined, the reproduction image is reproduced in operation S1606.

Figure 17:
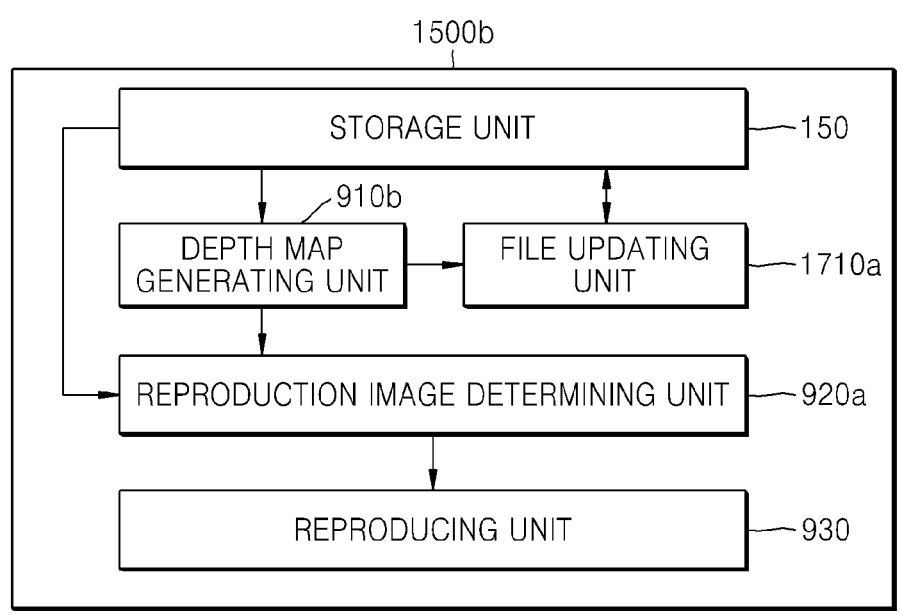
FIG. 17 is a block diagram of an image reproducing apparatus, according to another embodiment.

FIG. 17 is a block diagram of an image reproducing apparatus 1500b, according to another embodiment. The image reproducing apparatus 1500b according to the current embodiment includes the storage unit 150, a depth map generating unit 910b, a file updating unit 1710a, the reproduction image determining unit 920a, and the reproducing unit 930.

The storage unit 150 stores at least one image file generated according to one or more embodiments. As described above, the image file may include a plurality of images, focus value information of each of the plurality of images, and focus value information of a field.

The depth map generating unit 910b determines a representative image of the plurality of images stored in the image file, and generates a depth map of the representative image. According to the current embodiment, when an electronic apparatus does not generate a depth map because, for example, of low specifications or to reduce a file generating time, the image reproducing apparatus 1500b may generate the depth map and store the depth map in the image file. Alternatively, even when the image file includes the depth map, the image reproducing apparatus 1500b may again generate the depth map for precision. Thus, according to the current embodiment, when the image reproducing apparatus 1500b reproduces an image focused to a point selected by a user, it is possible to determine a further accurate reproduction image.

The file updating unit 1710a stores the depth map generated by the depth map generating unit 910b in the image file. Here, the focus value information of the field stored in the image file may be replaced by the depth map.

The reproduction image determining unit 920a determines a reproduction image to be reproduced by using the depth map, when the image file captured and generated according to one or more embodiments is reproduced.

When the image file is reproduced, the representative image may be reproduced first. When the user selects one point in the representative image while the representative image is being reproduced, the reproduction image determining unit 920a obtains a depth value of the selected point by using the depth map, and determines an image having a focus value that is closet to a focus value corresponding to the depth value, as the reproduction image.

A user input for selecting one point may be received even while reproducing one of the plurality of images. At this time, the reproduction image determining unit 920a may obtain a depth value of the selected point by using the depth map, and determine an image having a focus value that is closest to a focus value corresponding to the depth value as the reproduction image.

The reproducing unit 930 reproduces the reproduction image determined by the reproduction image determining unit 920a.

Figure 18:
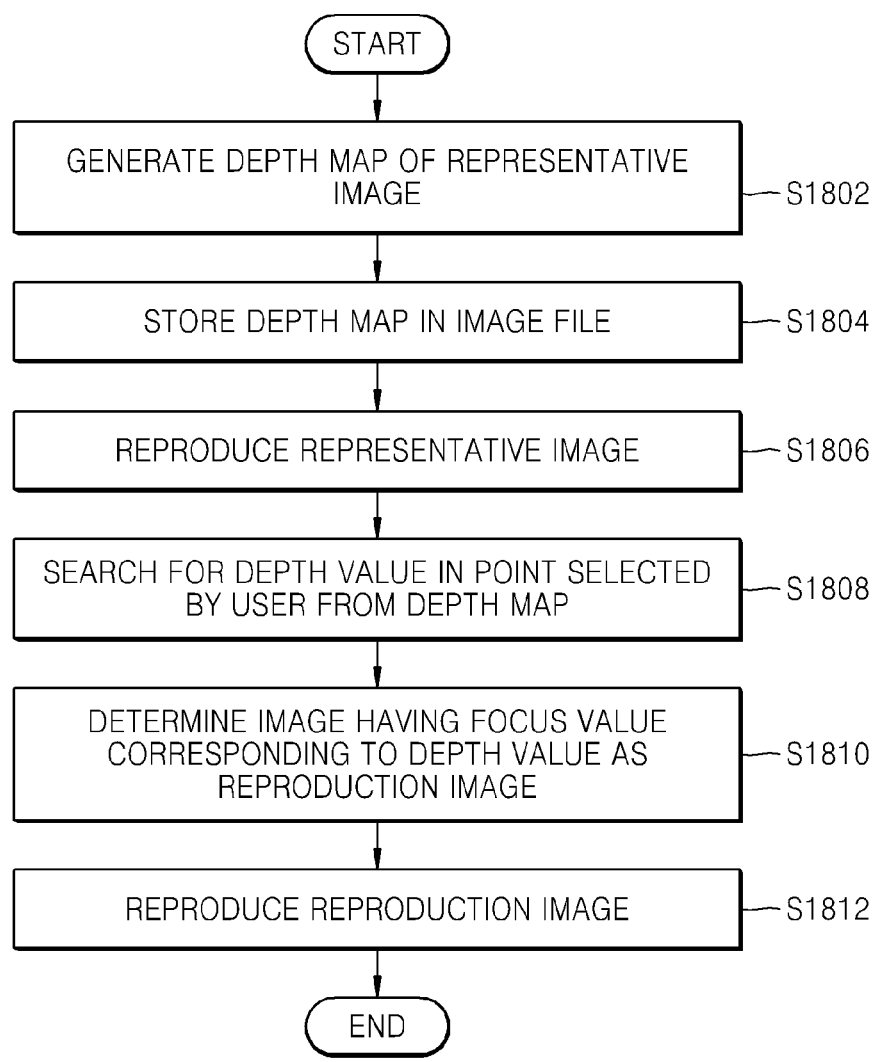
FIG. 18 is a flowchart of an image reproducing method, according to another embodiment.

FIG. 18 is a flowchart of an image reproducing method, according to another embodiment.

When a user selects to reproduce of an image file, a depth map of a representative image of the image file is generated in operation S1802. Focus value information of a field in the image file is replaced by the depth map, and thus the image file is updated in operation S1804.

Then, the representative image is reproduced in operation S1806. When a user input for selecting one point of the representative image is input while reproducing the representative image, a depth value of the selected point is searched for from the depth map in operation S1808. Then, an image having a focus value corresponding to the depth value or that is closest to a focus value of the depth value is determined as a reproduction image in operation S1810. After the reproduction image is determined, the reproduction image is reproduced in operation S1812.

A user input for selecting one point may also be received even while reproducing the reproduction image. At this time, an image having a focus value that is closest to a depth value of the point may be determined as a reproduction image by using the depth map.

Figure 19:
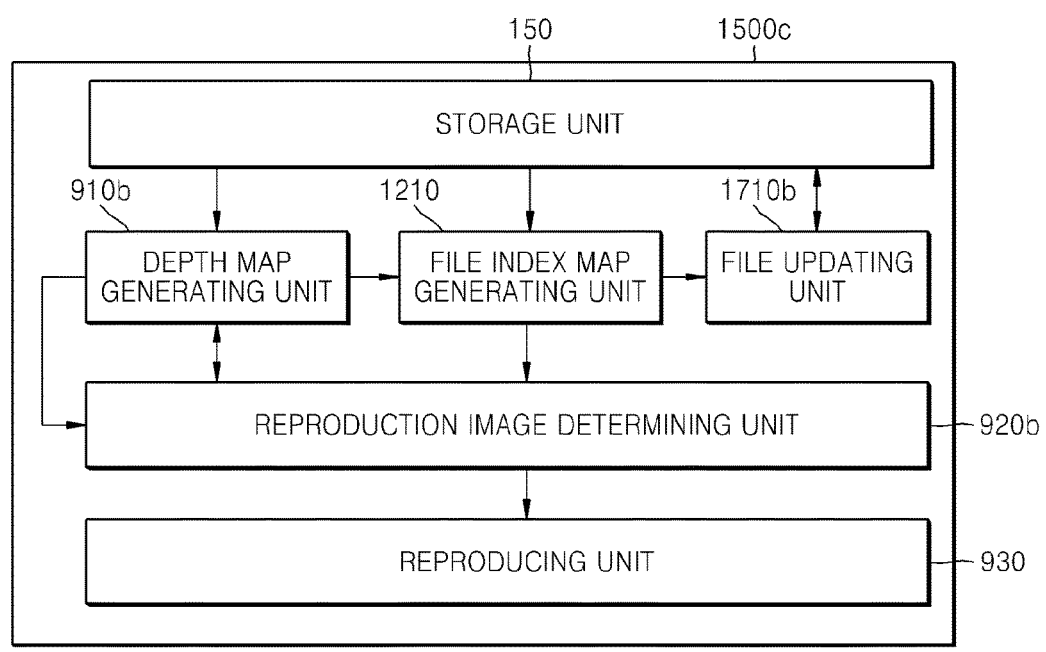
FIG. 19 is a block diagram of an image reproducing apparatus, according to another embodiment.

FIG. 19 is a block diagram of an image reproducing apparatus 1500c, according to another embodiment. The image reproducing apparatus 1500c according to the current embodiment includes the storage unit 150, the depth map generating unit 910b, the file index map generating unit 1210, a file updating unit 1710b, the reproduction image determining unit 920b, and the reproducing unit 930.

The storage unit 150 stores at least one image file generated according to one or more embodiments. As described above, the image file may include a plurality of images, focus value information of each of the plurality of images, and focus value information of a field.

The depth map generating unit 910b determines a representative image of the plurality of images in the image file, and generates a depth map of the representative image.

The file index map generating unit 1210 matches each pixel of the representative image to one of the plurality of images by matching a depth value of each pixel of the representative image to a focus value of each of the plurality of images by using the depth map. The file index map generating unit 1210 then generates a file index map indicating information about an image matched to each pixel of the representative image. In other words, the file index map indicates which pixel of the representative image corresponds to which image of the plurality of images.

According to the current embodiment, when an electronic apparatus does not generate a file index map to reduce a file generating time, the image reproducing apparatus 1500c may generate and store the file index map in the image file. Also, even when a depth map is stored in the image file, the image reproducing apparatus 1500c may generate a depth map again for precision, and then generate a file index map by using the depth map and store the file index map in the image file. Thus, according to the current embodiment, when the image reproducing apparatus 1500c reproduces an image focused to a point selected by a user, it is possible to accurately and quickly determine a reproduction image.

The file updating unit 1710b stores the file index map generated by the file index map generating unit 1210 in the image file. Here, the focus value information of the field stored in the image file may be replaced by the file index map.

When the image file captured and generated according to one or more embodiments is reproduced, the reproduction image determining unit 920b may determine the reproduction image by using the file index map.

When the image file is reproduced, the representative image may be first reproduced. When the user selects one point of the representative image while the representative image is being reproduced, the reproduction image determining unit 920b may search for and determine a reproduction image corresponding to the selected point by using the file index map.

A user input for selecting one point may be received even while reproducing one of the plurality of images. At this time, the reproduction image determining unit 920b may search for and determine a reproduction image corresponding to the selected point by using the file index map.

The reproducing unit 930 reproduces the reproduction image determined by the reproduction image determining unit 920b.

Figure 20:
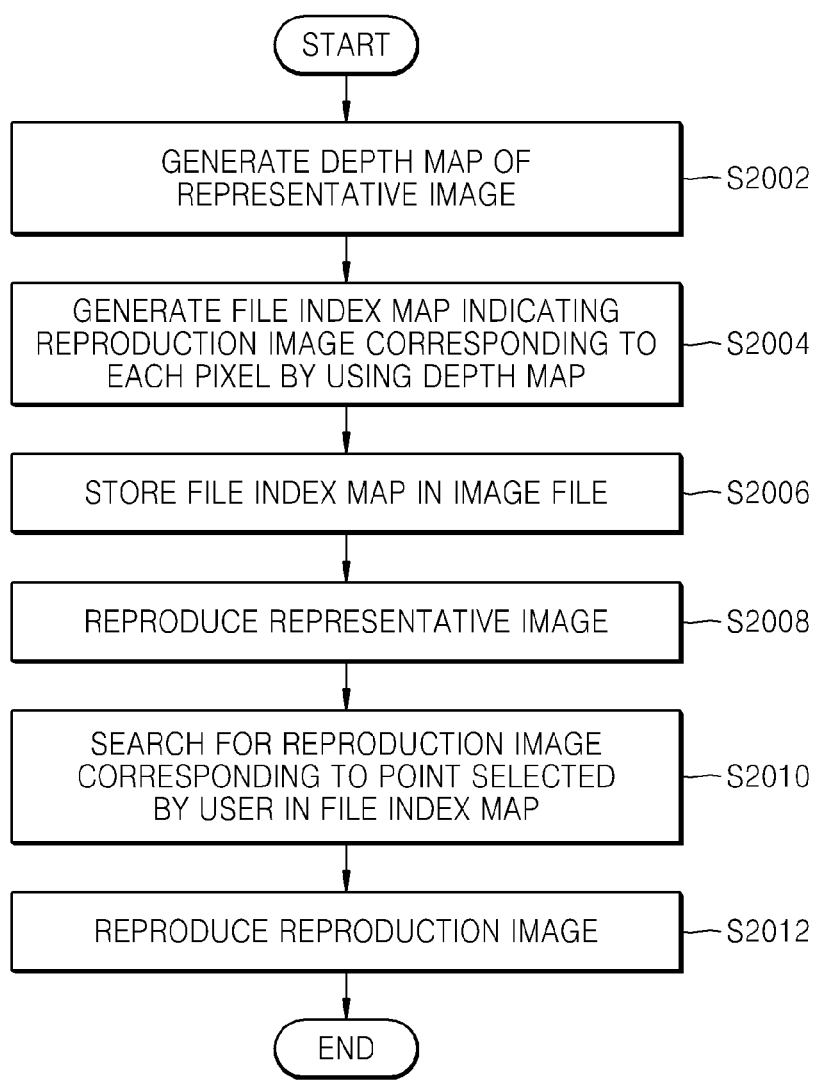
FIG. 20 is a flowchart of an image reproducing method, according to another embodiment.

FIG. 20 is a flowchart of an image reproducing method, according to another embodiment.

When a user selects to reproduce an image file, a depth map of a representative image of the image file is generated in operation S2002. As described above, the depth map may be generated by using a plurality of images captured according to a plurality of focal lengths. Also, it is possible to generate the depth map by using focus information obtained while scanning a focus lens to generate a focus map. If the depth map already exists in the image file, operation S2002 may be omitted.

After the depth map is generated, a file index map indicating a reproduction image corresponding to each pixel of the representative image is generated by using the depth map in operation S2004. Then, the file index map is stored in the image file in operation S2006. Here, focus value information of a field stored in the image file may be replaced by the file index map, or the image file may be updated to store both of the focus value information of the field and the file index map.

Then, the representative image is reproduced in operation S2008. When a user input for selecting one point in the representative image is input while reproducing the representative image, a reproduction image corresponding to the selected point is searched for in the file index map in operation S2010. When the reproduction image is determined, the reproduction image is reproduced in operation S2012.

A user input for selecting one point may also be received even while reproducing the reproduction image. At this time, a reproduction image corresponding to the selected point may be searched for by using the file index map, and the reproduction image may be determined.

As described above, according to the one or more of the above embodiments, a user may adjust a focus of an image at a predetermined location in a field after the image is captured.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the invention have been described with reference to the figures, it will be understood by those of ordinary skill in the art that various changes in form and details may be made therein without departing from the spirit and scope of the invention as defined by the following claims.

What is claimed is:

1. A method of controlling an electronic apparatus, the method comprising:
    generating a focus map by moving a focus lens that indicates focus values of a plurality of blocks defined by splitting a field;
    generating a capturing sequence by aligning the focus values of the plurality of blocks of the focus map in an order;
    capturing a plurality of images of the field according to the order of the focus values aligned in the capturing sequence, wherein each image of the plurality of images corresponds to one of the focus values in the focus map which corresponds to one of the plurality of blocks in the field; and
    storing the plurality of images, focus value information of each of the plurality of images, and focus value information of the field,
    wherein the generating of the capturing sequence comprises:
    when the number of focus values of the plurality of blocks is greater than a maximum number of capturing times, grouping the focus values and replacing the grouped focus values with a representative value; and
    when the number of focus values of the plurality of blocks is less than the minimum number of capturing times, adding a focus value between two adjacent focus values, wherein a difference between the two adjacent focus values is largest among differences between two adjacent focus values in the focus map.

2. The method of claim 1, further comprising:
    determining a representative image of the plurality of images; and
    generating a depth map of the representative image using the plurality of images,
    wherein the focus value information of the field is the depth map.

3. The method of claim 2, further comprising:
    reproducing at least one image from among the plurality of images;

while displaying the reproduced at least one image, determining one of the plurality of images, which has a focus value corresponding to a depth value at a point of the depth map, as a reproduction image, according to an input selection of the point; and
reproducing the reproduction image.

4. The method of claim 1, further comprising:
determining a representative image of the plurality of images;
generating a depth map of the representative image using the plurality of images;
matching each pixel of the representative image to one of the plurality of images by matching a depth value of the each pixel of the representative image to a focus value of the plurality of images using the depth map; and
generating a file index map indicating a reproduction image matched to the each pixel of the representative image,
wherein the focus value information of the field is the file index map.

5. The method of claim 4, further comprising:
reproducing at least one image from among the plurality of images;
while displaying the reproduced at least one image, determining one of the plurality of images matching a point selected according to an input selection, as the reproduction image, using the file index map; and
reproducing the reproduction image.

6. The method of claim 1, further comprising:
while capturing the plurality of images, stopping the capturing of the plurality of images when a movement of the electronic apparatus is outside a global motion compensable range; and
compensating a global motion of the plurality of images after the plurality of images is captured.

7. An electronic apparatus comprising:
a photographing unit configured to photograph an image by photo electrically converting incident light by using an image pickup device;
a processor configured to generate a focus map by moving a focus lens that indicates focus values of a plurality of blocks defined by splitting a field,
generate a capturing sequence by aligning the focus values of the plurality of blocks of the focus map in an order, and
control the photographing unit to capture a plurality of images according to the order of the focus values in the capturing sequence wherein each image of the plurality of images corresponds to one of the plurality of blocks in the field, and
store the plurality of images, focus value information of each of the plurality of images, and focus value information of the field,
wherein:
when the number of focus values of the plurality of blocks is greater than a maximum number of capturing times, the processor groups the focus values and replaces the grouped focus values with a representative value, and
when the number of focus values of the plurality of blocks is less than the minimum number of capturing times, the processor adds a focus value between two adjacent focus values, wherein a difference between the two adjacent focus values is largest among differences between two adjacent focus values in the focus map.

8. The electronic apparatus of claim 7, wherein the process is further configured to:
determine a representative image of the plurality of images and generates a depth map of the representative image using the plurality of images,
wherein the focus value information of the field is the depth map.

9. The electronic apparatus of claim 8, wherein the processor is further configured to:
determine one of the plurality of images, which has a focus value corresponding to a depth value at one point of the depth map, as a reproduction image, according to an input selection of the point while at least one image from among the plurality of images is displayed, and
control a display to display the reproduction image.

10. The electronic apparatus of claim 7, wherein the processor is further configured to:
determine a representative image of the plurality of images and generates a depth map of the representative image using the plurality of images, and
match each pixel of the representative image to one of the plurality of images by matching a depth value of each pixel of the representative image to a focus value of the plurality of images using the depth map, and generates a file index map indicating a reproduction image matched to each pixel of the representative image,
wherein the focus value information of the field is the file index map.

11. The electronic apparatus of claim 10, wherein the processor is further configured to:
determine one of the plurality of images, which matches a point selected according to an input selection while at least one image from among the plurality of images is displayed, as the reproduction image, using the file index map, and
control a display to display the reproduction image.

12. The electronic apparatus of claim 7, wherein the processor is further configured to:
stop the photographing unit from capturing the plurality of images when a movement of the electronic apparatus is outside a global motion compensable range, while the plurality of images is being captured, and
compensate for a global motion of the plurality of images after the plurality of images are captured.

13. A non-transitory computer-readable recording medium having recorded thereon computer program codes for executing a method of controlling an electronic apparatus when executed by a processor, the method comprising:
generating a focus map by moving a focus lens that indicates focus values of a plurality of blocks defined by splitting a field;
generating a capturing sequence by aligning the focus values of the plurality of blocks of the focus map in an order;
capturing a plurality of images of the field according to the order of the focus values aligned in the capturing sequence, wherein each image of the plurality of images corresponds to one of the focus values in the focus map which corresponds to one of the plurality of blocks in the field; and
storing the plurality of images, focus value information of each of the plurality of images, and focus value information of the field,
wherein the generating of the capturing sequence comprises:
when the number of focus values of the plurality of blocks is greater than a maximum number of capturing times, grouping the focus values and replacing the grouped focus values with a representative value, and when the number of focus values of the plurality of blocks is less than the minimum number of capturing times, adding a focus value between two adjacent focus values, wherein a difference between the two adjacent focus values is largest among differences between two adjacent focus values in the focus map.

* * * * *